Oct. 31, 1961 L. A. DE ROSA ET AL 3,007,163
RADIO DIRECTION FINDER
Filed Jan. 23, 1950 4 Sheets-Sheet 1

INVENTORS
LOUIS A. DE ROSA
LAURIN G. FISCHER
BY R P Morris
ATTORNEY

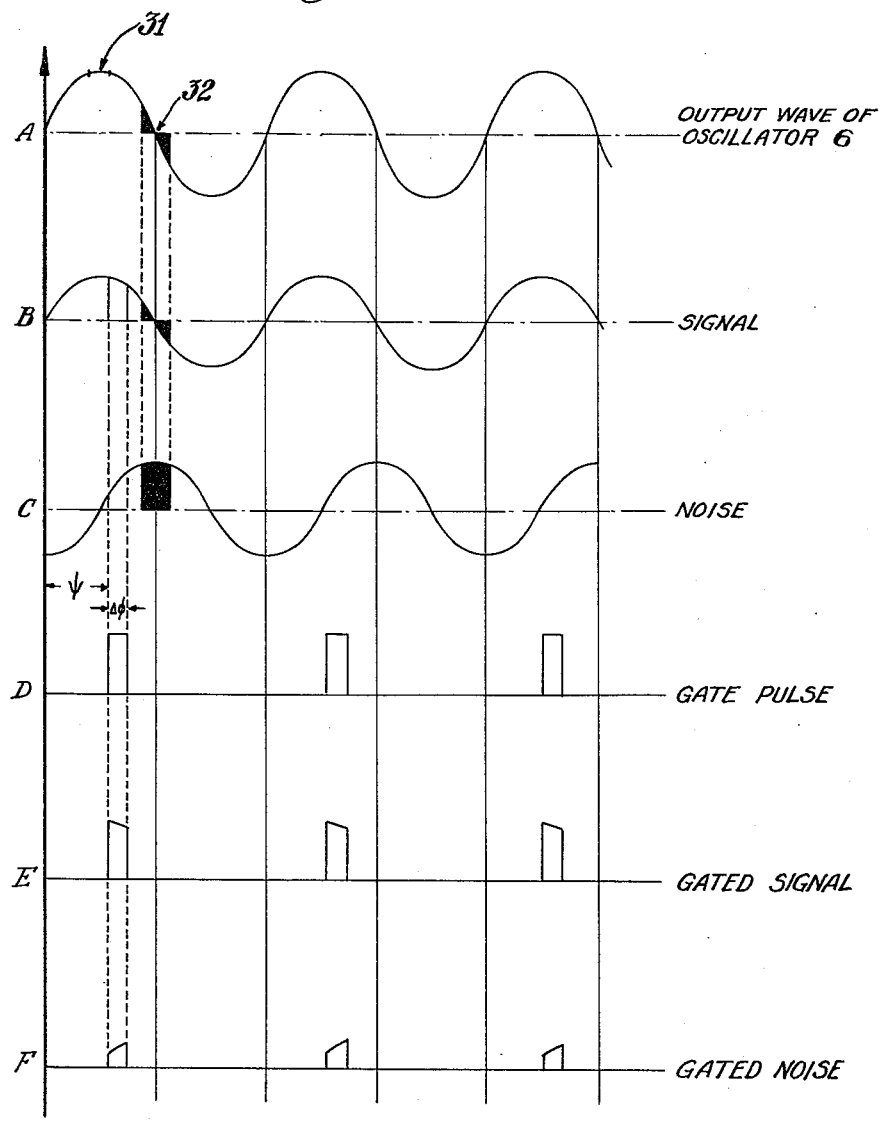

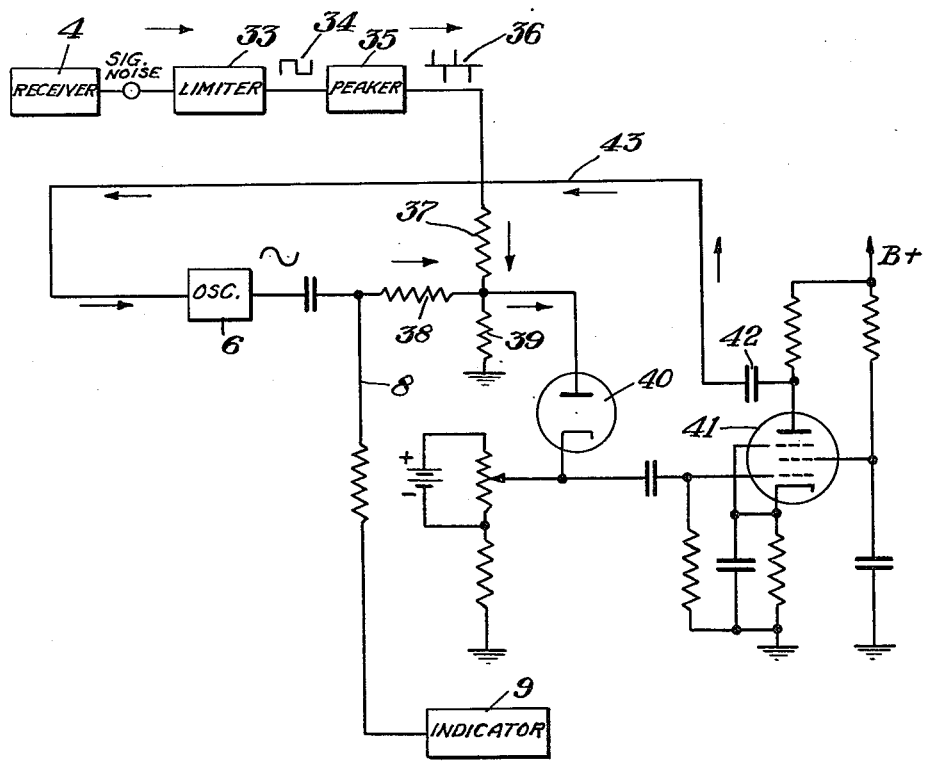

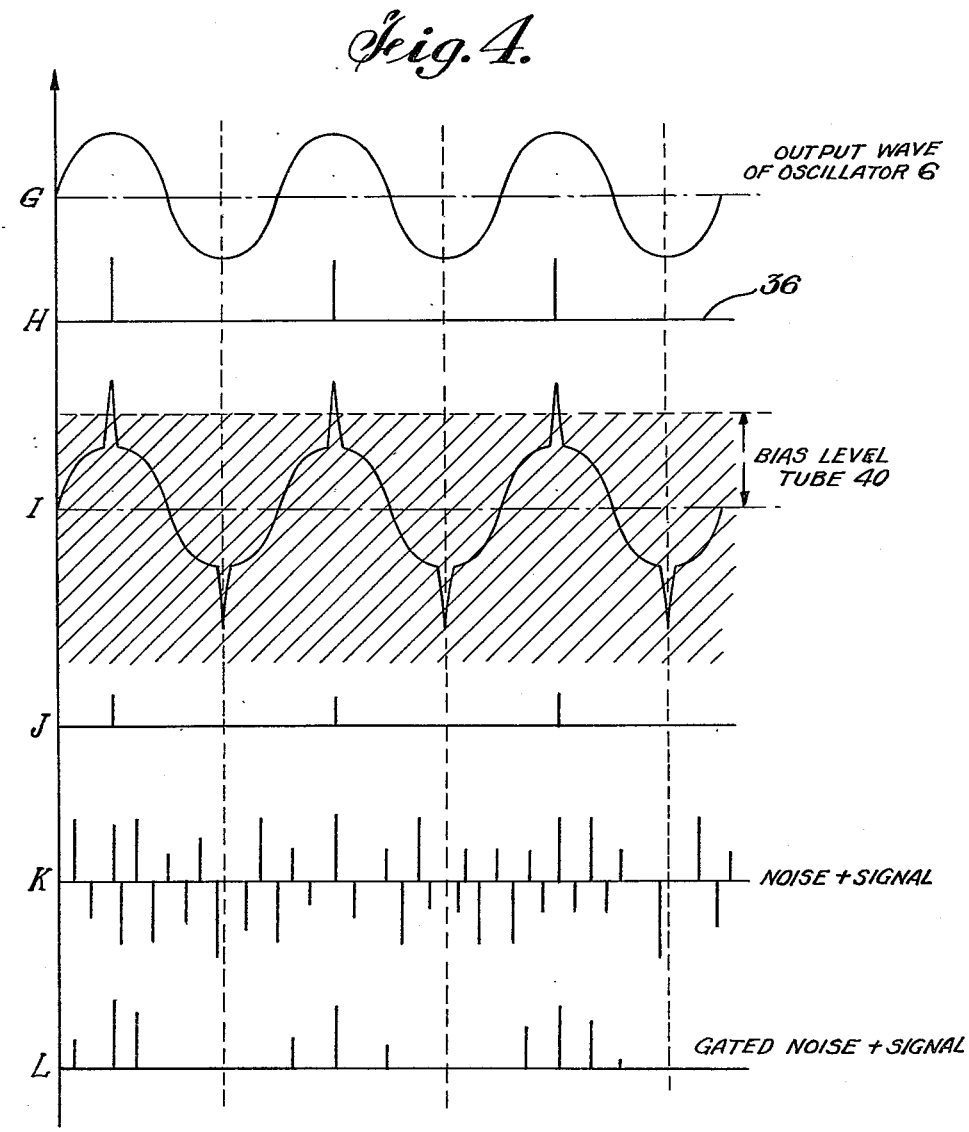

United States Patent Office 3,007,163
Patented Oct. 31, 1961

3,007,163
RADIO DIRECTION FINDER
Louis A. De Rosa, Bloomfield, and Laurin G. Fischer, North Arlington, N.J., assignors to International Telephone and Telegraph Corporation, a corporation of Maryland
Filed Jan. 23, 1950, Ser. No. 140,160
12 Claims. (Cl. 343—118)

This invention relates to radio direction finders and particularly to direction finders of the type in which the signal pattern of a received wave is compared in phase with a locally generated wave of the same frequency.

In direction finders of a known type, a rotatable antenna is provided which will produce an output sine wave envelope of a frequency depending upon the speed of rotation of the antenna and a pattern dependent upon the directive character of the antenna. Thus if an antenna producing a normal cardioid pattern is rotated, either physically or electrically, received energy detection will provide a sine wave output. If a locally generated wave is provided having a frequency and phase relationship corresponding with the rotation of the antenna and this wave is compared with the receiver output envelope wave an indication of the direction will be obtained which is a measure of the phase between the received wave envelope and the locally generated wave. In such type of direction finders errors may occur in the direction reading when noise energy is present at a sufficiently high amplitude to affect the wave pattern of the received wave. Thus the noise energy may be sufficiently great to block out a weak signal so that it will become unreadable. Moreover, such noise energy may have frequency components comparable with those of the envelope wave which upon combining with the envelope may cause a phase shift and a consequent error in the indicated direction.

Attempts have been made to overcome the undesired effects of noise energy by filtering the output envelope wave through a very sharp filter having cut-offs close to the frequency of rotation of the antenna. These systems are helpful in removing the obliterated effect of energy. However, such sharply tuned filters are necessarily of a high Q and therefore require considerable time in operation to build up a wave of sufficient amplitude to make the proper phase comparison. Because of the narrow band width such receivers are of less usefulness in direction finding purposes of nearby objects since the relative angular motion of a moving object with respect to the direction finder may be quite high at close distances.

The high Q filter cannot respond with sufficient rapidity to such nearby signals to follow a fast moving object. Moreover, while such filtering arrangements will mitigate the effect of obliterating noise they will not correct for phase shifting effects caused by the low frequency components of the noise signal.

As a consequence, in conditions of high noise to signal level which is generally the signal from distant objects, where otherwise the high Q filter would be of its greatest use, they are particularly subject to phase shift errors due to the likelihood of these harmful components being present in the large amplitude noise energy.

It is an object of this invention to provide a direction finder of the type described above wherein there is provided an effective high Q filtering action by means of a local oscillator which may be readily synchronized with the envelope receiver output energy. Such an oscillator is not so readily subject to phase shift errors as is a sharp filter circuit and at the same time it may be made readily responsive to phase shifts of the received energy produced by fast moving nearby transmitting objects.

According to a feature of this invention there is provided a radio direction finder including a continuously rotatable directive antenna with a receiver for detecting the energy received to provide an output wave having a fundamental frequency component dependent upon the speed of rotation of the antenna and of a phase dependent upon the position of a source, which wave is compared with the output of an alternator rotated synchronously with the antenna and with this system is incorporated an arrangement for minimising the noise effect on the directive indication including an oscillator tuned to the fundamental component of the received signal, the output of this oscillator being coupled to the indicator and the input of the oscillator being coupled to the receiver output to maintain synchronism of this oscillator with the fundamental frequency component of the received wave.

In a practical form of this invention the oscillator may take the form of a Wien bridge or phase shift oscillator which is capable of operating at the relatively low frequency, generated by the antenna rotation, with a high degree of frequency fidelity. This oscillator may be synchronized directly from the output of the receiver detector system of the direction finder.

With such a system the oscillator may be brought into phase very quickly by strong received signals so that nearby objects can be readily followed. On the other hand, when the signal level is low the oscillator will progressively narrow down its angle of possible error with each successive envelope undulation so that very accurate direction indications may be obtained from distant radiators after several rotations of the antenna even though more time is required to get an accurate bearing than on nearby radiations.

Direction finders of this type have one inherent weakness in that the oscillator is least sensitive to synchronizing signals at its maximum output amplitude and has its greatest sensitivity at the point where the envelope frequency goes through zero. At the zero point the received signal is also zero so that such a direction finder is more susceptible to noise components tending to cause the phase shift at the very time that it has no signal potential available to hold it in place. Accordingly, a further feature of this invention comprises a modified type of direction finder in which means is arranged effectively to gate the portion of the received signal to exclude from the oscillator energy tending to control its phase at the time when the received signal is zero. This may be accomplished by processing the output energy from the receiver so as only to use portions of the envelope of an amplitude at a predetermined value above the zero level. For example, the received sine wave output may be shaped by clipper action to produce substantially square waves which may then be differentiated and applied to synchronize the local oscillator.

The above-mentioned and other features and objects of this invention and the manner of attaining them will become more apparent and the invention itself will be best understood by reference to the following description of an embodiment of the invention taken in conjunction with the accompanying drawings, wherein:

FIG. 2 is a graphical representation illustrating how quadrantal received noise may adversely affect the phase synchronism;

FIG. 3 is a schematic diagram partly in block form illustrating a modified form of direction finder in accordance with this invention wherein gating means are provided to mitigate the noise effect; and FIG. 4 is a graphical representation used in explaining the operation of the system shown in FIG. 3.

Figure 1:
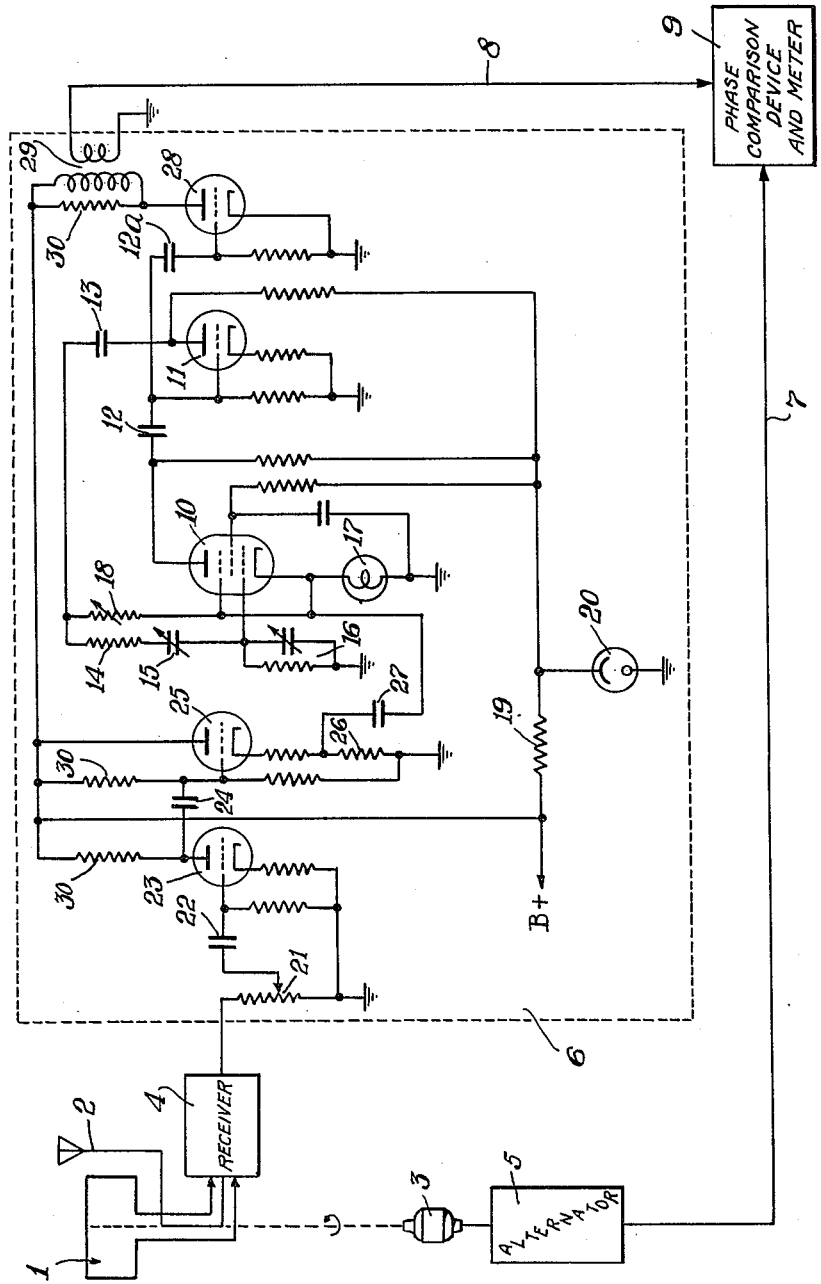
FIG. 1 is a schematic diagram partly in block form of a direction finder incorporating features of this invention.

Turning now to FIG. 1, there is indicated a directive antenna 1 with an omnidirectional antenna 2 which may be rotated at a constant rate by means of a motor 3. It should be clearly understood that the particular form of antenna illustrated is simply made by way of illustration since any type of antenna desirable for the purpose may be used. Antennas 1 and 2 are coupled to a receiver 4 which serves to amplify and detect the received signal to produce an output envelope having a fundamental frequency component dependent upon the speed of rotation of the antenna system. This may be considered as a since wave component since such is generally obtained from a rotating antenna. Synchronously with the rotation of directive antenna 1 is driven an alternator 5 which will produce a wave of the same frequency as the fundamental envelope frequency component derived from receiver 4. At 6 is shown an oscillator circuit which may be synchronized with the output wave from receiver 4. The outputs of alternator 5 and oscillator 6 are applied over respective lines 7 and 8 to a phase comparison device and meter 9.

In FIG. 1 the oscillation generator is shown as a particular form of Wien bridge of phase shift oscillator. The oscillator itself consists of tubes 10 and 11 and their associated circuits. The output of tube 10 is coupled through coupling condenser 12 to the grid of tube 11 whose cathode is coupled to ground as shown. The anode of tube 11 is back coupled through condenser 13 and a phase shifting network consisting of resistor 14 and condenser 15 to the input or control grid of tube 10. A variable grid bias is provided for tube 10 by means of network 16 and a thermistor cathode element 17. Part of the output energy from tube 11 is likewise coupled through the variable resistor 18 to the suppressor grid and cathode of tube 10. Anode potentials for tubes 10 and 11 as well as screen grid potential for tube 10 are applied from B+ source over resistor 19. This voltage may be maintained substantially at a constant level by means of a control glow tube 20. The circuit connections are such that the required 360° phase shift to maintain a circuit in oscillation is provided through the phase shift in the tubes and the coupling network.

The envelope wave from receiver 4 is applied to the oscillator by way of the potentiometer 21, coupling condenser 22, tube 23, coupling condenser 24, tube 25, cathode resistor 26, condenser 27 and variable thermistor 17 to the cathode of oscillator tube 10. This envelope wave thus tends to synchronize in phase the oscillations of the oscillator. Because of the gain control effect of thermistor 17, strong signals will tend to reduce the Q of the oscillator, bringing it into synchronism at a rapid rate. The output of the oscillator is applied over the coupling condensers 12 and 12a to the grid of an output amplifier or coupling tube 28, then by way of a transformer 29 and line 8 to the comparison device and meter 9. Plate potential is applied to tubes 23, 25 and 28 from B+, via load resistors 30 to the anodes of these tubes.

With this type of system and with a cardioid antenna rotating at 900 r.p.m. a 15 cycle sine wave is observed at the output of the receiver. In a circuit as set up this was fed directly to the oscillator circuit as described and thence to the azimuth meter and comparison device. It was found that rotatable bearings no worse than plus or minus 4° were obtained with signal-to-noise ratio as low as 1:20. It was found that some improvements in operation could be obtained by including in the output of the receiver a relatively sharp filter tuned to a narrow band including the 15 cycle output wave.

In direction finders of the type described above it is clear that for all practical purposes the degree of ambiguity of the receiver can be narrowed down to a relatively small angle compared to the complete 360° azimuth sweep. For example, if an airplane is at a 10 mile radius from the direction finder and the direction finder is rotating so as to provide a 15 cycle wave, the aircraft travelling on a circular course, it will be apparent that the craft will travel through only 1/30 degree for one revolution of the antenna. As a consequence, quite a number of rotations of the direction finder antenna may be made with an allowable error of 2°. Upon the first rotation of the antenna if the oscillator is not synchronized completely the phase shift will be such as to be brought closer into phase so that the angle of error is considerably narrowed and after four or five rotations the oscillator will be very closely in step with the envelope pattern. Since the noise impulses incoming with the signal are of a generally random nature, only those noise impulses coming within the significant directional indicating period of rotation will have any appreciable effect on the synchronzation of the system. Thus it will be seen that most of the noise received through the greater part of the rotation of the antenna will be ignored by the system. As the oscillator is progressively brought into synchronization the possible angle of effective noise interference is narrowed until it is reduced to a very small angle with respect to the whole.

The significant directional indicating portion of the envelope band is generally the null point of a cardioidal diagram. This point is represented in a sine wave graph at the position where a sine wave goes through zero.

Turning now to FIG. 2, graph A represents the sine wave output of the oscillator. At the peak amplitude of this oscillator wave as represented at the section 31 the oscillator is incapable of being effected by any signal applied thereto since at this peak its rate of change is substantially zero. However, at the point 32 where the instantaneous drive of the oscillator is zero the synchronizing voltage is most effective. Since at this time the desired synchronizing voltage is also zero, out of phase noise components will most strongly affect synchronization of the oscillator and produce the greatest disturbance. If we assume a signal is in phase with the oscillator as indicated by graph B and that a noise component 90° out of phase with the oscillator is present as indicated at graph C, it will be recognized that this noise will have the greatest possible effect on the synchronization of the oscillator. However, if there is provided a gating pulse as indicated by graph D, which is spaced from the zero axis of the signal so that only a portion of the signal will be passed during the gating interval then the incoming signal will have a given amplitude as shown by graph E, while the noise component admitted through the gate will have a much lower amplitude component as shown in graph F. Accordingly, if the system is provided so that the signal can be effective for synchronizing the oscillator during only a limited portion of its time as shown by this graph then the harmful 90° noise component will be accordingly reduced in amplitude and will have less effect on the phase of the oscillator.

In FIG. 3 is shown a gating system which may be applied to the receiver arrangement of FIG. 1. In this arrangement the receiver 4, oscillator 6 and the indicator 9 are shown in simple rectangular blocks the signal and noise output from receiver 4 is applied to a limiter 33 producing an output wave shown on 34 having a fundamental frequency equal to the principal output wave component. This wave may be differentiated or otherwise clipped in peaker 35 providing an output wave of the form shown at 36. This wave 36 is combined with the sine wave output of oscillator 6 over a combining network comprising resistors 37, 38 and 39. The combined wave output appearing across resistor 39 is rectified in detector 40 which is biased so that only the positive peaks of the combined wave are passed onto amplifier 41 from whence they are applied over condenser 42 and line 43 to the input of oscillator 6 for the purpose of synchronizing this oscillator. Output waves from oscillator 6 are also applied over line 8 to the indicator 9.

FIG. 4 illustrates graphically the operation of the circuit as described. Graph G represents the sine wave output from oscillator 6 and graph H the pulse output 36 from peaker 35. This combined wave is represented by graph I and the shaded portion thereof represents the bias of tube 40 which passes only the peak signals. These peak signals appear in graph J as the gating pulses for operation of the system. Thus the noise and signal, graph K, coming from receiver 4 is reduced by gating pulses to the small number of pulses shown in graph L.

While the general principles of operation and certain embodiments of this invention have been described above it will be clear that these are given by way of example and not as a limitation on the invention. Many modifications will readily occur to one skilled in the art. For example, any type of oscillator which is relatively stable in frequency and which may be readily synchronized may be used. Likewise, many modifications of the gating circuits and the like as specifically described herein will readily occur to those skilled in the art.

We claim:

1. In a radio direction finder of the type having a comparison device for producing direction indications and a receiver to produce a wave component of the received radio energy envelope for comparison in said comparison device with a locally generated wave of the same frequency to derive the direction indication, means for mitigating the effect of noise on the direction indications comprising, a local oscillator adapted to operate at substantially the frequency of said wave component coupled to deliver energy to said comparison device and connections from said receiver for synchronizing said oscillator in response to said received radio energy envelope.

2. A radio direction finder according to claim 1, wherein said connections for synchronizing comprise means for deriving discrete pulses of energy from the received energy envelope at points between the maxima and zero values of said wave components, and means for applying these pulses to control said local oscillator.

3. A radio direction finder according to claim 1, wherein said local oscillator comprises a phase shift oscillator having a current responsive cathode resistor, and said connections for synchronizing comprising means for applying synchronizing voltage across said cathode resistor.

4. A radio direction finder according to claim 3, in which there is provided a receiver detector for detecting received energy to provide the envelope wave wherein said connections for synchronizing comprise a coupler for coupling the output of said receiver to said cathode resistor.

5. A radio direction finder according to claim 3, wherein said connections for synchronizing comprise means for shaping said received radio frequency envelope to provide sharp unipotential pulses.

6. A radio direction finder according to claim 5, wherein said shaping means comprises a limiter for providing substantially rectangular waves, means for differentiating said rectangular waves to provide positive and negative pulses, means for combining said pulses with the wave output of said local oscillator and means for clipping the combined wave to pass only pulse peaks to synchronize said oscillator.

7. A radio direction finder according to claim 6, wherein said oscillator is tuned normally to operate at a frequency slightly different from the frequency of said wave component, whereby the pulse peaks passed will serve progressively to bring said oscillator into sharper synchronism with said envelope wave.

8. In a radio direction finder comprising a rotatable directive antenna, means for detecting energy received by said antenna to derive an energy wave having a fundamental frequency component dependent upon the speed of rotation of said antenna and of a phase dependent upon the directive position of the source of radiation of the received energy, a generator synchronized with the rotation of said antenna for generating a comparison wave of said component fundamental frequency, and a phase comparator indicator for comparing the phase of said fundamental frequency component and said comparison wave to indicate direction; means for minimizing the effect of noise energy on the directive indication of said indicator comprising an oscillator tuned to the said fundamental component frequency having the output coupled to said indicator, and means for applying said derived energy wave to said oscillator to maintain it in phase synchronism with said fundamental frequency component.

9. In a radio direction finder comprising a rotatable directive antenna, means for detecting energy received by said antenna to derive an energy wave having a fundamental frequency component dependent upon the speed of rotation of said antenna and of a phase dependent upon the directive position of the source of radiation of the received energy, a generator synchronized with the rotation of said antenna for generating a comparison wave of said component fundamental frequency, and a phase comparator indicator for comparing the phase of said fundamental frequency component and said comparison wave to indicate direction; means for minimizing the effect of noise energy on the directive indication of said indicator comprising an oscillator provided with a cathode input circuit and tuned to the said fundamental component frequency having the output coupled to said indicator, and means for applying said derived energy wave to said cathode input circuit to maintain it in phase synchronism with said fundamental frequency component.

10. In a radio direction finder comprising a rotatable directive antenna, means for detecting energy received by said antenna to derive an energy wave having a fundamental frequency component dependent upon the speed of rotation of said antenna and of a phase dependent upon the directive position of the source of radiation of the received energy, a generator synchronized with the rotation of said antenna for generating a comparison wave of said component fundamental frequency, and a phase comparator indicator for comparing the phase of said fundamental frequency component and said comparison wave to indicate direction; means for minimizing the effect of noise energy on the directive indication of said indicator comprising an oscillator having a gain controlling input circuit and tuned to the said fundamental component frequency having the output coupled to said indicator, and means for applying said derived energy wave to said input circuit to maintain it in phase synchronism with said fundamental frequency component.

11. In a radio direction finder comprising a rotatable directive antenna, means for detecting energy received by said antenna to derive an energy wave having a fundamental frequency component dependent upon the speed of rotation of said antenna and of a phase dependent upon the directive position of the source of radiation of the received energy, a generator synchronized with the rotation of said antenna for generating a comparison wave of said component fundamental frequency, and a phase comparator indicator for comparing the phase of said fundamental frequency component and said comparison wave to indicate direction; means for minimizing the effect of noise energy on the directive indication of said indicator comprising an oscillator provided with a current variable cathode resistor input and tuned to the said fundamental component frequency having the output coupled to said indicator, and means for applying said derived energy wave to said input to maintain it in phase synchronism with said fundamental frequency component.

12. In a radio direction finder comprising a rotatable directive antenna, means for detecting energy received by said antenna to derive an energy wave having a fundamental frequency component dependent upon the speed of rotation of said antenna and of a phase dependent upon the directive position of the source of radiation of the received energy, a generator synchronized with the rotation of said antenna for generating a comparison wave of said component fundamental frequency, and a phase comparator indicator for comparing the phase of said fundamental frequency component and said comparison wave to indicate direction; means for minimizing the effect of noise energy on the directive indication of said indicator comprising an oscillator tuned to the said fundamental component frequency having the output coupled to said indicator, and means for applying at least a portion of said derived energy wave to said oscillator to maintain it in phase synchronism with said fundamental frequency component.

References Cited in the file of this patent
UNITED STATES PATENTS

| | | |
|---|---|---|
| 2,403,626 | Wolff et al. | July 9, 1946 |
| 2,404,238 | Loughlin et al. | July 16, 1946 |
| 2,468,110 | Richardson | Apr. 26, 1949 |

FOREIGN PATENTS

| | | |
|---|---|---|
| 577,824 | Great Britain | June 3, 1946 |